US011932179B2

(12) United States Patent
Michallet et al.

(10) Patent No.: US 11,932,179 B2
(45) Date of Patent: Mar. 19, 2024

(54) MOTOR VEHICLE WITH A BOX FOR ELECTRONIC COMPONENTS EXTENDING BELOW THE FLOOR OF THE CABIN

(71) Applicant: Volvo Truck Corporation, Gothenburg (SE)

(72) Inventors: Rémi Michallet, Péronnas (FR); Patrick Dalmas, Valencin (FR)

(73) Assignee: Volvo Truck Corporation, Gothenburg (SE)

( * ) Notice: Subject to any disclaimer, the term of this patent is extended or adjusted under 35 U.S.C. 154(b) by 54 days.

(21) Appl. No.: 17/540,532

(22) Filed: Dec. 2, 2021

(65) Prior Publication Data

US 2022/0185205 A1     Jun. 16, 2022

(30) Foreign Application Priority Data

Dec. 10, 2020   (EP) ..................................... 20213119

(51) Int. Cl.
*B60R 16/00* (2006.01)
*B60R 11/00* (2006.01)
*B62D 33/06* (2006.01)

(52) U.S. Cl.
CPC .............. *B60R 16/00* (2013.01); *B60R 11/00* (2013.01); *B62D 33/06* (2013.01); *B60R 2011/0003* (2013.01)

(58) Field of Classification Search
CPC ................... B60R 7/04; B60R 11/0264; B60R 2011/0003; B60R 2011/0029; B60R 16/0239; B60R 16/0238; B60K 2001/0438

(Continued)

(56) References Cited

U.S. PATENT DOCUMENTS 4,813,736 A     3/1989  Schubert et al.
5,636,890 A *   6/1997  Cooper ..................... B60R 7/02
                                                     29/401.1

(Continued)

FOREIGN PATENT DOCUMENTS

DE      3706979 A1 *   9/1987
DE   10006398 A1 *   8/2001    ......... B60H 1/00564

(Continued)

OTHER PUBLICATIONS

JP-H11301359-A machine translation (Year: 1999).*
Extended European Search Report for European Patent Application No. 20213119.9, dated Mar. 3, 2021, 6 pages.

*Primary Examiner* — Joseph D. Pape
(74) *Attorney, Agent, or Firm* — Withrow & Terranova, PLLC

(57) ABSTRACT

The invention relates to a motor vehicle intended to be driven by a driver comprising a cabin comprising a floor with an upper surface, a passenger compartment delimited in a vertical direction by the upper surface of the floor and extending on an upper side of the upper surface, at least one electronic device configured to be electronically controlled, and a box housing an electronic equipment configured to control the at least one electronic device, wherein the box is waterproof and at least a portion of the box extends on a lower side of the upper surface, the lower side of the upper surface being opposite to the upper side. The invention also relates to a method for assembling the box to the cabin of the motor vehicle.

9 Claims, 3 Drawing Sheets

(58) Field of Classification Search
USPC .............................................. 296/37.14, 37.8
See application file for complete search history.

(56) References Cited

U.S. PATENT DOCUMENTS

| | | | | |
|---|---|---|---|---|
| 8,231,164 | B2 * | 7/2012 | Schubring | ................. B60R 7/04 |
| | | | | 296/193.07 |
| 8,706,396 | B2 * | 4/2014 | Itoh | ...................... H04B 1/3822 |
| | | | | 701/400 |
| 2004/0066025 | A1 | 4/2004 | Borroni-Bird et al. | |
| 2010/0319182 | A1 | 12/2010 | Sugimoto et al. | |
| 2013/0127200 | A1 * | 5/2013 | Saeki | ....................... B60K 1/04 |
| | | | | 296/37.14 |
| 2014/0326524 | A1 * | 11/2014 | Ogushi | ............... H01M 50/244 |
| | | | | 180/68.5 |
| 2015/0195960 | A1 * | 7/2015 | Seki | .................... H05K 9/0052 |
| | | | | 361/690 |
| 2017/0267089 | A1 * | 9/2017 | Sugizaki | ............. H01M 50/209 |
| 2018/0065458 | A1 * | 3/2018 | Ogawa | ..................... B60K 1/04 |
| 2020/0079208 | A1 * | 3/2020 | Suzuki | ................ H01M 10/613 |
| 2021/0300260 | A1 * | 9/2021 | Itoh | .................... B60R 16/0239 |
| 2022/0314774 | A1 * | 10/2022 | Toda | ....................... B60N 2/015 |

FOREIGN PATENT DOCUMENTS

| | | | | | |
|---|---|---|---|---|---|
| DE | 102019135236 | A1 | * | 6/2021 | |
| FR | 3036360 | A1 | * | 11/2016 | |
| GB | 2463570 | A | * | 3/2010 | ............. B60N 3/044 |
| JP | H06199137 | A | | 7/1994 | |
| JP | H11301359 | A | * | 11/1999 | |
| JP | 2013219861 | A | * | 10/2013 | ............. B60L 53/12 |
| WO | 2006020974 | A2 | | 2/2006 | |
| WO | WO-2019159437 | A1 | * | 8/2019 | ............. B60R 11/02 |

\* cited by examiner

MOTOR VEHICLE WITH A BOX FOR ELECTRONIC COMPONENTS EXTENDING BELOW THE FLOOR OF THE CABIN

RELATED APPLICATIONS

The present application claims priority to European Patent Application No. 20213119.9, filed on Dec. 10, 2020, and entitled "MOTOR VEHICLE WITH A BOX FOR ELECTRONIC COMPONENTS EXTENDING BELOW THE FLOOR OF THE CABIN," which is incorporated herein by reference in its entirety.

TECHNICAL FIELD

The present invention relates to motor vehicles, and in particular to the positioning of a box housing electronic equipment in the motor vehicle. This invention also relates to a method for assembling the box to the cabin of a motor vehicle.

BACKGROUND ART

In motor vehicles, a passenger compartment is provided for receiving the driver and passengers. Inside the passenger compartment, an instrument panel is disposed. The instrument panel is made up of a set of indicators and warning lights that inform the driver of the motor vehicle about the operation of the motor vehicle and about driving parameters such as the speed or the outside temperature. In addition to the indicators, the instrument panel includes a variety of accessories for comfort and safety such as ventilation, air conditioning, radio, audio supports, glove box, passenger airbag, electronic components for controlling electronic device in the motor vehicle, etc.

All these indicators and accessories take a lot of space in the instrument panel, and the remaining space that can be used for storage spaces, such as the glove box, is reduced.

Yet, the drivers and the passengers of motor vehicles are requesting more storage space in the instrument panel.

In the current motor vehicles, the arrangement of the various indicators and accessories has been optimized to provide maximum storage space. The compactness of the indicators and accessories has also been optimized. However, the available storage space in the instrument panel still does not meet the drivers and passengers request.

It is thus an object of the present invention to provide a motor vehicle which improves the situation by providing an instrument panel with more storage space.

SUMMARY

It is proposed a motor vehicle intended to be driven by a driver comprising:
- a cabin comprising a floor with an upper surface,
- a passenger compartment intended to receive the driver inside, delimited in a vertical direction by the upper surface of the floor and extending on an upper side of the upper surface;
- at least one electronic device configured to be electronically controlled;
- a box housing an electronic equipment configured to control the at least one electronic device;

wherein the box is waterproof and at least a portion of the box extends on a lower side of the upper surface, the lower side of the upper surface being opposite to the upper side.

Hence, said portion of the box extending on the lower side of the upper surface of the floor, is disposed below the upper surface of the floor when considering the vertical direction extending from the floor to the passenger compartment. The box can thus be disposed entirely below the upper surface of the floor, or partly below the upper surface of the floor and partly in the passenger compartment. In any case, the box is no longer disposed in the instrument panel of the motor vehicle, which frees up space in the instrument panel. Storage spaces can thus be created in the former location of the box in the instrument panel.

Moreover, the proposed location of the box in the invention limits the space taken by the box inside the passenger compartment. Indeed, as at least a portion of the box is below the floor of the cabin, said portion is thus not positioned in the passenger compartment.

The box is also waterproof to protect the electronic equipment housed inside the box from the external environment of the cabin. Thus, even if the box is more exposed to the external environment of the cabin than when it was in the instrument panel, the protection of the electronic equipment is still guaranteed.

According to one aspect, at least 75% of the box extends on the lower side of the upper surface, preferably at least 90% of the box extends on the lower side of the upper surface.

It means that at least 75%, preferably 90%, of the box extends below the floor of the cabin. It thus minimizes the proportion of the box protruding inside the passenger compartment. The available space for the driver and the passengers in the passenger compartment is barely not impacted by the location of the box.

According to one aspect, the floor comprises a housing receiving said at least portion of the box.

In a first alternative, the housing is a hole through the floor.

In a second alternative, the housing is a recess formed in relation to the upper surface of the floor.

For the first and second alternatives, the box can thus be positioned in the motor vehicle from the inside of the cabin, which avoids any contact between the electronic equipment and the external environment of the cabin.

According to one aspect, the housing comprises a peripheral wall extending from the upper surface of the floor, the peripheral wall comprising at least one abutment supporting the housing.

The abutment enables to position the box in the housing and provides a support to secure the box in the housing.

According to one aspect, the box comprises a top wall oriented toward the passenger compartment, and leveled with the upper surface of the floor in the vertical direction.

Thus, no part of the box is disposed inside the passenger compartment. Moreover, the top wall of the box is easily reachable from the inside of the cabin for maintenance.

According to one aspect, the electronic equipment is an electronic control unit (ECU) or a fuse and relay center (FRC).

According to one aspect, the motor vehicle comprises at least one cable extending from the box to the electronic device to connect the electronic equipment and the electronic device, a portion of the cable extending in the passenger compartment, on the upper surface of the floor of the cabin.

The cable is thus protected from the external environment of the cabin.

According to one aspect, the box is positioned on a passenger side of the cabin.

Hence, the box is away from the steering column of the vehicle. The box is thus easy to assemble to the vehicle, and the box is thus more easily accessible for maintenance.

The invention is also directed to a method for assembling the box to the cabin of the motor vehicle as described above.

In particular, the cabin comprises a door opening delimiting the passenger compartment in a transversal direction which is perpendicular to the vertical direction, and an instrument panel, and the method comprises the steps of:

introducing the instrument panel and the box simultaneously in the passenger compartment through the door opening, positioning and fixing the instrument panel on the cabin, positioning and fixing the box.

Introducing the box inside the passenger compartment simultaneously with the instrument panel enables to minimize the number of steps necessary to set the box in the motor vehicle.

BRIEF DESCRIPTION OF DRAWINGS

Other features, details and advantages will be shown in the following detailed description and on the figures, on which.

DESCRIPTION OF EMBODIMENTS

In the figures, the same references denote identical or similar elements. For sake of clarity, various elements may not be represented at scale.

In the description, the longitudinal direction L is defined as the direction from the rear to the front of the vehicle when considering the normal direction of travel of the vehicle, the transverse direction T is defined as the direction perpendicular to the longitudinal direction and from one side of the vehicle to the other, and the vertical direction V is defined from top to bottom, as the direction perpendicular to the longitudinal direction and to the transverse direction.

Figure 1:
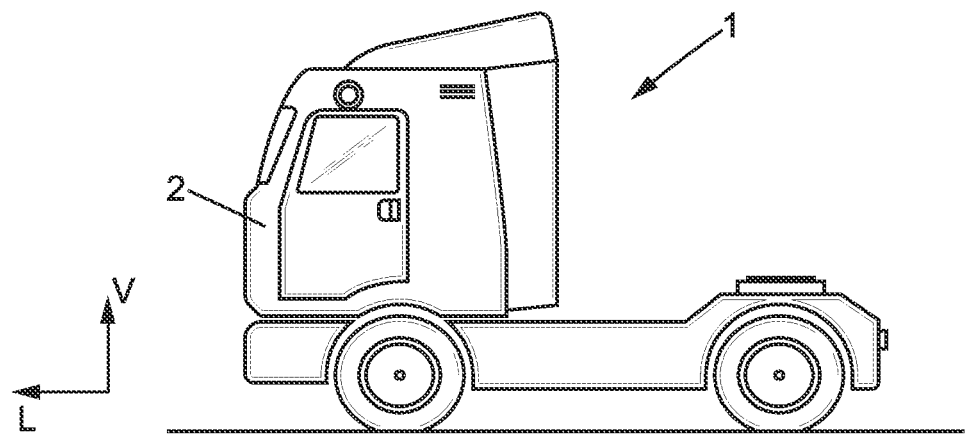
FIG. 1 illustrates a side view of a truck comprising a cabin.

FIG. 1 shows a truck 1 comprising a cabin 2. Although the description presents a truck 1 as a motor vehicle, it is understood that the invention applies to any type of vehicle such as a car, a bus or any other ground vehicle.

Figure 2:
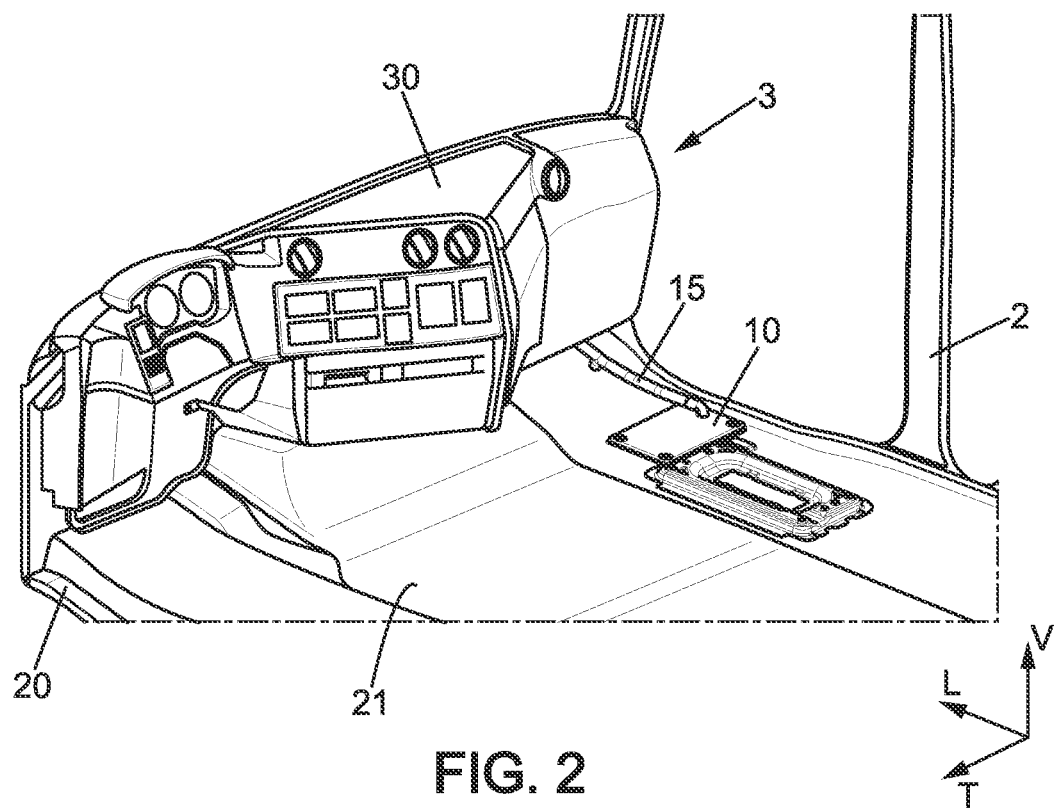
FIG. 2 represents the cabin of the truck of FIG. 1 from the inside of the cabin, the cabin comprising a floor in which a box is set.

The cabin 2 of the truck comprises a floor 20 with an upper surface 21. As shown on FIG. 2, the upper surface 21 of the floor delimits a passenger compartment 3 of the truck 1 in the vertical direction V. The passenger compartment 3 is intended to receive the driver of the truck 1, and passengers if any. The passenger compartment 3 extends on an upper side 21U of the upper surface 21.

An instrument panel 30 is set in the passenger compartment 3. The instrument panel 30 is attached to the cabin 2, on the upper side 21U of the upper surface 21 of the floor 20.

The truck 1 also comprises a box 10 housing an electronic control unit (ECU). The electronic control unit controls at least one electronic device of the truck 1. The electronic device can be disposed in the instrument panel. The electronic device can be one or more actuators responsible for the operation of the truck. For example, they participate to the engine performance, or power steering, or comfort and security features such as parking assistance, airbag deployment. Through the control of the actuators, the ECU thus controls the engine performance, or power steering, or comfort and security features.

The box 10 could alternatively houses a fuse and relay center (FRC) or any other electronic equipment configured to control an electronic device in the truck 1.

Figure 3:
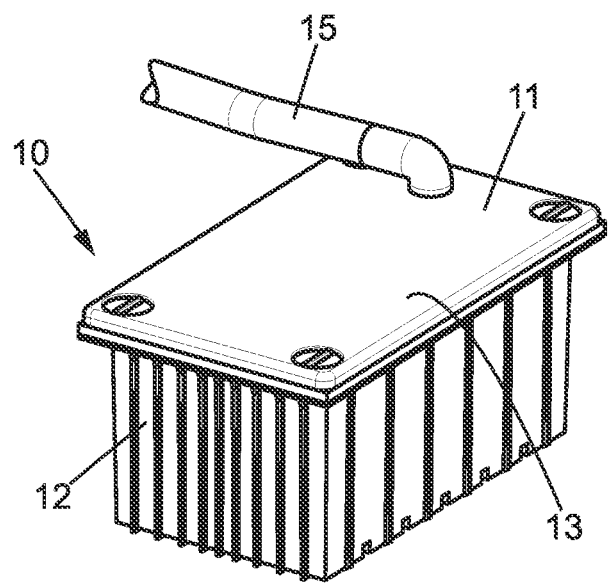
FIG. 3 represents the box.

The box 10 is represented on FIG. 3. The box 10 has substantially a rectangular shape. It has a planar top wall 11 and vertical sides 12. The top wall 11 extends beyond the vertical sides 12, and forms a flange 13. A cable 15 extends from the top wall 11 of the box 10. The cable 15 enables to connect the electronic control unit, which is inside the box 10, with the electronic device that is controlled by the electronic control unit.

The cable 15 connecting the electronic control unit with the electronic device extends in the passenger compartment 3, at least partly on the upper surface 21 of the floor 20. All the cable 15 extends inside the cabin 2. It starts from the top wall 11 of the box 10, which enables it to be directly into the cabin 2, and then extends on the upper surface 21 of the floor 20 until it reaches the instrument panel 30. The cable 15 is thus protected from the external environment of the cabin 2.

The box 10 is positioned on a passenger side of the cabin 2 so as to be away from the steering column. The box 10 is thus easy to assemble to the truck 1, and easily accessible for maintenance.

The box 10 extends on a lower side 21L of the upper surface 21 of the floor 20. The lower side 21L of the upper surface 21 is opposite to the upper side 21U of the upper surface 21 in the vertical direction V. The vertical direction V is oriented from the floor 20 to the passenger compartment 3. In other words, the box 10 extends below the upper surface 21 of the floor 20.

The box 10 can thus be disposed entirely below the upper surface 21 of the floor 20, or partly below the upper surface 21 of the floor 20 and partly in the passenger compartment 3. As the box is positioned at least partially below the upper surface 21 of the floor 20, the box 10 is not positioned in the instrument panel 30. Storages spaces can thus be created inside the instrument panel 30.

Preferably, at least 75% of the box 10 extends on the lower side 21L of the upper surface 21. More preferably, at least 90% of the box 10 extends on the lower side 21L of the upper surface 21. This minimizes the proportion of the box 10 protruding inside the passenger compartment 3. Hence, the available space in the passenger compartment 3 for receiving the driver and the passengers is barely not impacted by the presence of the box 10.

Figure 4:
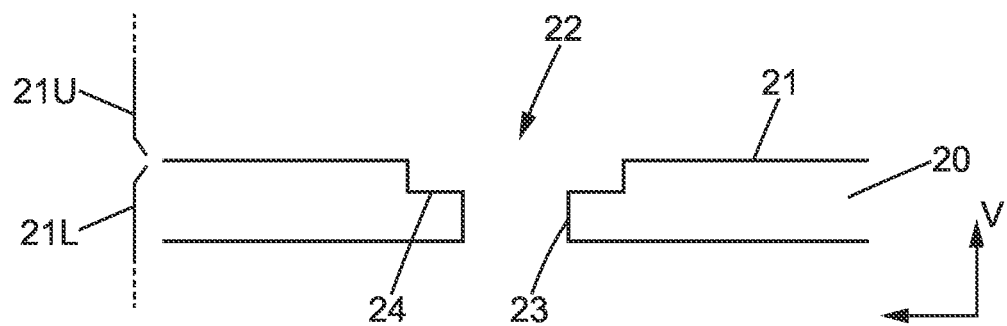
FIG. 4 schematically represents a cross sectional view of the floor of the cabin comprising a housing.

The floor 20 comprises a housing 22 for receiving the box 10. The housing 22 is schematically represented on FIG. 4. The housing 22 is a hole through the floor 20. In a non represented alternative, the housing could be a recess formed in relation to the upper surface 21 of the floor 20.

The housing 22 comprises a peripheral wall 23 extending from the upper surface 21 of the floor 20. The peripheral wall 23 comprises one abutment 24 for supporting the box 10. The shape of the housing 22 is thus adapted to receive the box 10.

Figure 5:
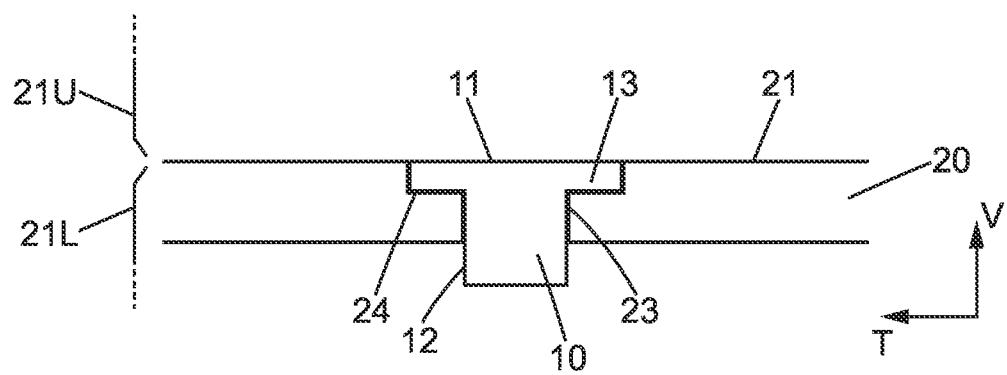
FIG. 5 schematically represents the cross sectional view of the floor of the cabin of the FIG. 4, the box being inserted in the housing.

FIG. 5 schematically represents the box 10 positioned inside the housing 22 of the floor 20. When the box 10 is positioned in the housing 22, the vertical sides 12 of the box 10 are facing the peripheral wall 23 of the housing 22. The flange 13 is supported by the abutment 24. The abutment 24 enables to position the box 10 in the housing 22 and provides a support to secure the box 10 in the housing 22. The box 10 can be attached to the floor by screws attaching the flange 13 to the floor 20 at the abutment 24.

Besides, the top wall 10 is leveled with the upper surface 21 of the floor 20, in the vertical direction V. The box 10 is thus entirely below the upper surface 21 of the floor 20, and easily reachable from the inside of the passenger compartment 3.

Figure 6:
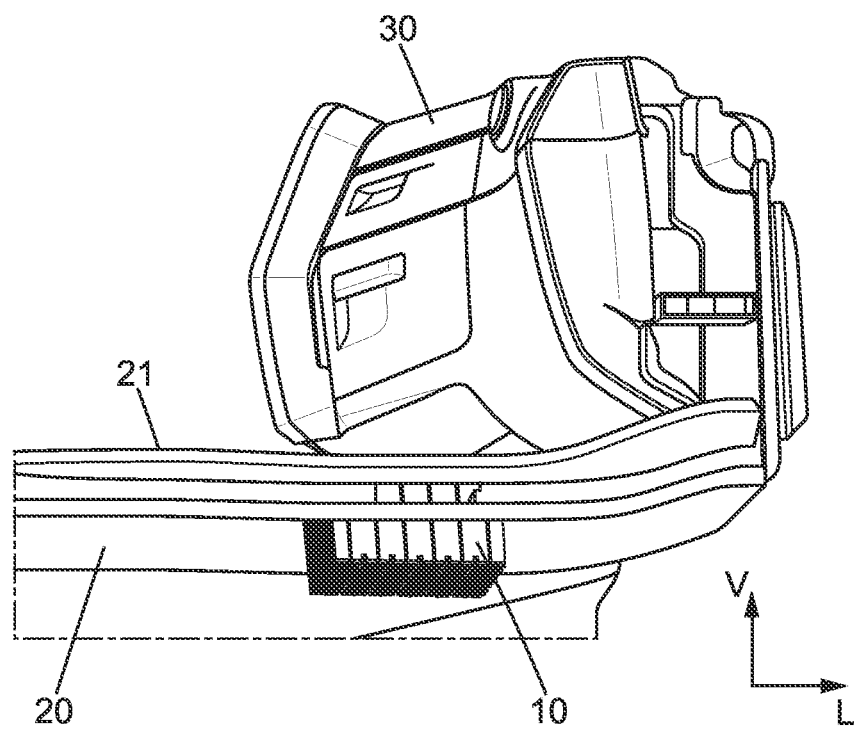
FIG. 6 represents the cabin of the truck of FIG. 1 from the outside of the cabin.

As can be seen on FIGS. 5 and 6, the vertical sides 12 of the box 10 extend beyond the floor 20.

To protect the electronic control unit from the external environment of the box 10, such as dust and water, the box 10 is waterproof. Thus, even if the box 10 is not entirely protected by the floor 20, the electronic control unit is still protected, which guarantees the proper operation of the control unit and the truck 1.

Figure 7:
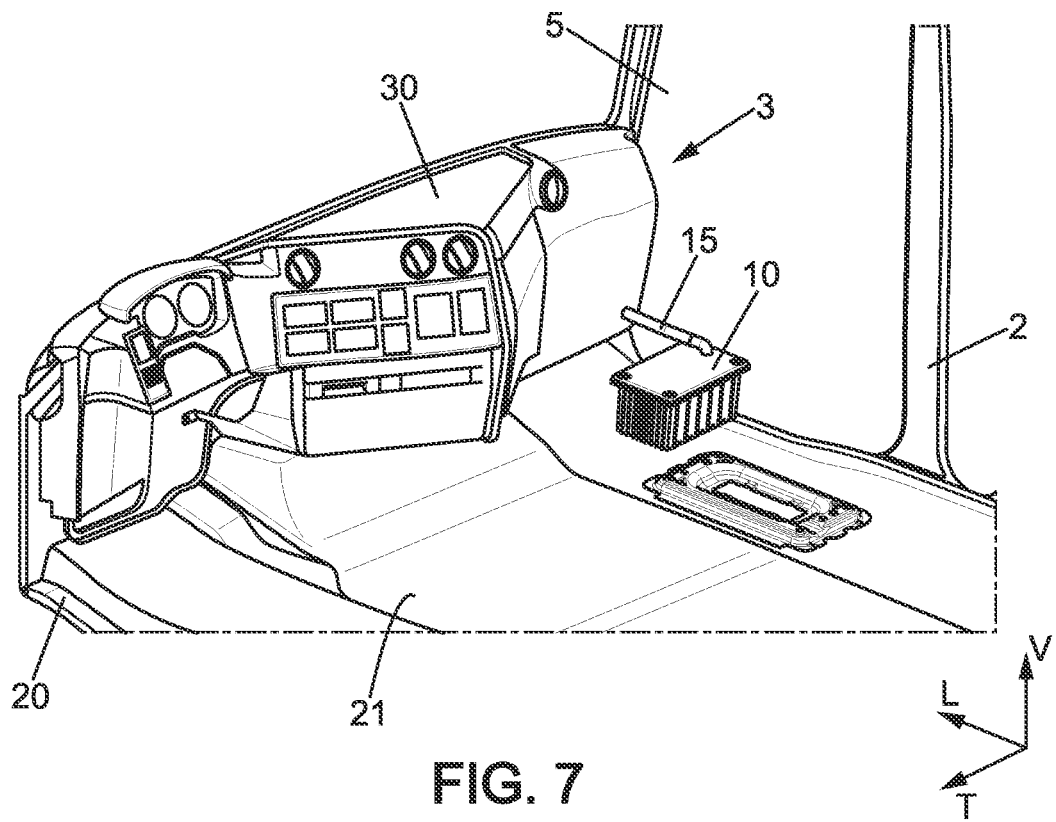
FIG. 7 represents an assembly step of the box in the truck.

For assembling the box 10 to the cabin 2 of the truck 1, the instrument panel 30 and the box 10 are simultaneously introduced in the passenger compartment 3 through the door opening 5 of the cabin 2, as shown on FIG. 7.

Then, the instrument panel 30 is positioned and fixed on the cabin 2.

Once the instrument panel 30 is fixed, the box 10 is positioned and fixed on the cabin 2.

Introducing the box 10 inside the passenger compartment 3 simultaneously with the instrument panel 30 enables to minimize the number of steps necessary to set the box 10 in the cabin 2.

The invention claimed is:

1. A motor vehicle to be driven by a driver, the motor vehicle being a truck, comprising:
    a cabin comprising a floor with an upper surface;
    a passenger compartment configured to receive a driver inside, delimited in a vertical direction by the upper surface of the floor and extending from an upper side of the upper surface; and
    a box housing electronic equipment configured to control at least one electronic device located outside the box; wherein:
    the box is waterproof and at least a portion of the box extends on a lower side of the upper surface, the lower side of the upper surface being opposite to the upper side;
    the box comprises a top wall oriented toward the passenger compartment and a top surface of the top wall leveled with the upper surface of the floor in the vertical direction; and
    the box comprises vertical sides, the top wall extending beyond the vertical sides and forming a flange, the box being attached to the floor by screws attaching the flange to the floor.

2. The motor vehicle of claim 1, wherein the floor comprises a housing receiving the at least a portion of the box.

3. The motor vehicle of claim 2, wherein the housing comprises a hole through the floor.

4. The motor vehicle of claim 2, wherein the housing is a recess formed in relation to the upper surface of the floor.

5. The motor vehicle of claim 2, wherein the housing comprises a peripheral wall extending from the upper surface of the floor, the peripheral wall comprising at least one abutment supporting the box.

6. The motor vehicle of claim 1, wherein the electronic equipment is an electronic control unit (ECU) or a fuse and relay center (FRC).

7. The motor vehicle of claim 1, comprising at least one cable extending from the box to the electronic device to connect the electronic equipment and the electronic device, a portion of the cable extending in the passenger compartment on the upper surface of the floor.

8. The motor vehicle of claim 1, wherein the box is positioned on a passenger side of the cabin.

9. A method for assembling, comprising:
    introducing an instrument panel and a box simultaneously in a passenger compartment through a door opening of a cabin of a motor vehicle, the door opening delimiting the passenger compartment in a transversal direction which is perpendicular to a vertical direction, the box housing electronic equipment configured to control at least one electronic device, the box being waterproof and at least a portion of the box extending on a lower side of an upper surface of the cabin, the lower side of the upper surface being opposite to the upper side;
    positioning and fixing the instrument panel on the cabin; and
    positioning and fixing the box.

* * * * *